(12) United States Patent
Ma et al.

(10) Patent No.: US 12,099,761 B2
(45) Date of Patent: Sep. 24, 2024

(54) IMAGE FORMING APPARATUS, METHOD, AND SYSTEM FOR FIRMWARE UPGRADE

(71) Applicant: Zhuhai Pantum Electronics Co., Ltd., Zhuhai (CN)

(72) Inventors: Longwei Ma, Zhuhai (CN); Yongjiu Jiang, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 82 days.

(21) Appl. No.: 17/678,397

(22) Filed: Feb. 23, 2022

(65) Prior Publication Data

US 2022/0272222 A1 Aug. 25, 2022

(30) Foreign Application Priority Data

Feb. 24, 2021 (CN) .......................... 202110232584.5

(51) Int. Cl.
 *G06F 8/65* (2018.01)
 *G06F 3/12* (2006.01)
 *H04L 67/00* (2022.01)
 *H04L 67/60* (2022.01)

(52) U.S. Cl.
 CPC .............. *G06F 3/1225* (2013.01); *G06F 8/65* (2013.01); *G06F 3/1204* (2013.01); *H04L 67/34* (2013.01); *H04L 67/60* (2022.05)

(58) Field of Classification Search
 CPC ........................................................ G06F 8/65
 See application file for complete search history.

(56) References Cited

U.S. PATENT DOCUMENTS

| | | | | |
|---|---|---|---|---|
| 6,148,383 A * | 11/2000 | Micka | ................. | G06F 11/2074 714/E11.107 |
| 9,740,472 B1 * | 8/2017 | Sohi | ...................... | G06F 15/173 |
| 10,831,419 B1 | 11/2020 | Zakharov | | |
| 11,126,385 B1 * | 9/2021 | Zakharov | .............. | G06F 3/1229 |
| 2004/0054800 A1 * | 3/2004 | Shah | ................... | H04L 67/1095 709/240 |
| 2006/0047713 A1 * | 3/2006 | Gornshtein | ............. | G06F 16/27 |
| 2007/0253723 A1 * | 11/2007 | Fujii | .................. | G03G 15/6538 399/75 |
| 2008/0114876 A1 * | 5/2008 | Nigorikawa | ....... | H04N 1/00973 709/224 |
| 2009/0251730 A1 * | 10/2009 | Yamaguchi | ........ | H04N 1/00973 358/1.15 |

(Continued)

FOREIGN PATENT DOCUMENTS

| | | |
|---|---|---|
| CN | 111638891 A | 12/2020 |
| CN | 112398673 A | 2/2021 |

(Continued)

*Primary Examiner* — Jae U Jeon
(74) *Attorney, Agent, or Firm* — ANOVA LAW GROUP, PLLC

(57) ABSTRACT

Embodiments of the present disclosure provide an image forming apparatus, a method and a system for firmware upgrade. The method includes when a server has a firmware upgrade package, downloading the firmware upgrade package from the server; and transmitting the firmware upgrade package to a second image forming apparatus. The firmware upgrade package is configured to upgrade firmware of the first image forming apparatus and the second image forming apparatus.

18 Claims, 5 Drawing Sheets

(56) References Cited

U.S. PATENT DOCUMENTS

| | | | |
|---|---|---|---|
| 2010/0315670 A1* | 12/2010 | Kojima | G06F 3/123 |
| | | | 358/1.15 |
| 2012/0062944 A1 | 3/2012 | Nakamoto | |
| 2013/0250329 A1* | 9/2013 | Satoh | G06F 3/1291 |
| | | | 358/1.13 |
| 2015/0334262 A1 | 11/2015 | Tsuruoka | |
| 2016/0062759 A1* | 3/2016 | Lu | H04L 43/0888 |
| | | | 717/173 |
| 2018/0150008 A1* | 5/2018 | Suzue | G03G 15/5029 |
| 2018/0210680 A1 | 7/2018 | Rj | |
| 2020/0379744 A1 | 12/2020 | Bhupati et al. | |
| 2023/0130398 A1* | 4/2023 | Yamada | G16Y 20/10 |
| | | | 358/1.15 |

FOREIGN PATENT DOCUMENTS

| | | |
|---|---|---|
| RU | 2580065 C2 | 4/2016 |
| RU | 2670388 C1 | 10/2018 |

\* cited by examiner

IMAGE FORMING APPARATUS, METHOD, AND SYSTEM FOR FIRMWARE UPGRADE

CROSS-REFERENCE TO RELATED APPLICATION

This application claims priority to Chinese patent application No. 202110232584.5, filed on Feb. 24, 2021, in the China National Intellectual Property Administration, the entirety of which is incorporated herein by their reference.

TECHNICAL FIELD

The present disclosure generally relates to the field of image forming apparatus technology and, more particularly, relates to an image forming apparatus, a method, and a system for firmware upgrade.

BACKGROUND

An image forming apparatus is an apparatus including a printer, a copier, a facsimile machine, a multifunctional image forming and copying apparatus, an electrostatic printing apparatus, and any other similar apparatus, which may form an image on a recording medium using an image forming principle.

In practical applications, to upgrade and optimize the performance of the image forming apparatus, the firmware of the image forming apparatus needs to be upgraded. The firmware of the image forming apparatus is normally stored in the supplier's server. During the upgrading process, the image forming apparatus may need to be connected to the supplier's server, download the firmware from the supplier's server to the local, and then start to perform the firmware upgrade.

However, when there are a relatively large number of image forming apparatuses, multiple image forming apparatuses may trigger the firmware download operation in parallel, and may be connected to the supplier's server simultaneously to download the firmware from the supplier's server, which may occupy a relatively large network bandwidth.

SUMMARY

The present disclosure provides an image forming apparatus, a method and a system for firmware upgrade, which is beneficial for solving the problems in the existing technology that multiple image forming apparatuses may be simultaneously connected to the supplier's server and download the firmware from the supplier's server, which may occupy a large network bandwidth.

An aspect of the present disclosure provides a firmware upgrade method, applied to a first image forming apparatus, and the method includes, when a server has a firmware upgrade package, downloading the firmware upgrade package from the server; and transmitting the firmware upgrade package to a second image forming apparatus. The firmware upgrade package is configured to upgrade firmware of the first image forming apparatus and the second image forming apparatus.

Another aspect of the present disclosure provides a firmware upgrade method, applied to a second image forming apparatus, the method includes: receiving a firmware upgrade package transmitted by a first image forming apparatus, and performing firmware upgrade according to the firmware upgrade package. The firmware upgrade package is a firmware upgrade package in a server downloaded by the first image forming apparatus.

Another aspect of the present disclosure provides an image forming apparatus. The image forming apparatus includes a processor; a memory; and one or more computer programs stored in the memory and including instructions. When being executed, the instructions cause the processor to execute the disclosed methods.

Another aspect of the present disclosure provides a firmware upgrade system. The firmware upgrade system a disclosed image forming apparatus that is communicatively connected to another image forming apparatus.

In embodiments of the present disclosure, after downloading the firmware upgrade package from the server, the first image forming apparatus forwards the firmware upgrade package to the second image forming apparatus, which avoids that all image forming apparatuses download the firmware upgrade package on the server side, thereby reducing network bandwidth occupation on the server side.

BRIEF DESCRIPTION OF THE DRAWINGS

To more clearly illustrate the technical solutions of embodiments of the present disclosure, the drawings that need to be used in embodiments are briefly described hereinafter. Obviously, the drawings in the following description are only some embodiments of the present disclosure. For those skilled in the art, other drawings may be obtained from these drawings without creative labor.

DETAILED DESCRIPTION

To better understand technical solutions of the present disclosure, the following describes embodiments of the present disclosure in detail with reference to the accompanying drawings.

It should be noted that described embodiments are only a part of embodiments of the present disclosure, rather than all embodiments. Based on embodiments in the present disclosure, all other embodiments obtained by those skilled in the art without creative work shall fall within the protection scope of the present disclosure.

The terms used in embodiments of the present disclosure are only for the purpose of describing specific embodiments and are not intended to limit the present disclosure. The singular forms of "a", "the" and "said" used in embodiments of the present disclosure and the appended claims are also intended to include plural forms, unless the context clearly indicates other meanings.

It can be understood that the term "and/or" used in the specification may only be an association relationship describing associated objects, which means that there may be three types of relationships. For example, A and/or B can mean that: A alone exists, A and B exist at the same time, and B exists alone. In addition, the character "/" in the specification normally indicates that the associated objects before and after are in an "or" relationship.

To facilitate those skilled in the art to better understand the technical solutions of the present disclosure, the terms in embodiments of the present disclosure are first described below.

Figure 1:
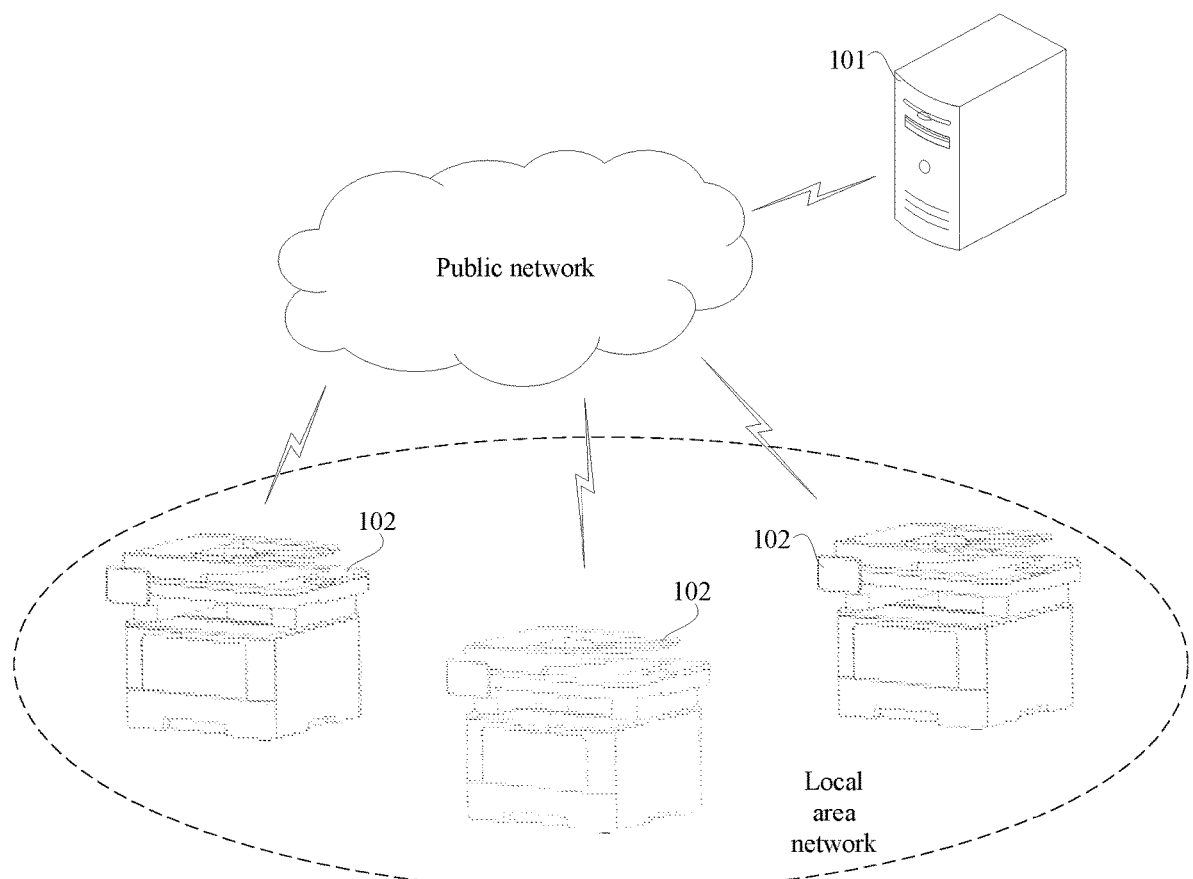
FIG. 1 illustrates a schematic of an application scenario provided by exemplary embodiments of the present disclosure.

Referring to FIG. 1, FIG. 1 illustrates a schematic of an application scenario provided by exemplary embodiments of the present disclosure. FIG. 1 may exemplarily illustrate one server 101 and three image forming apparatuses 102; and the server 101 may communicate with the image forming apparatuses 102 through a public network. Three image forming apparatuses 102 may be in a same local area network, so that different image forming apparatuses 102 may communicate through the local area network. Exemplarily, the local area network may be a short distance communication network such as a wifi hotspot network, a wifi P2P network, a Bluetooth network, a zigbee network, a near field communication (NFC) network, or the like.

It can be understood that the public network shown in FIG. 1 may be a wide area network. Exemplarily, the wide area network may be the 3rd generation mobile communication technology (3G) network, the 4th generation mobile communication technology (4G) network, the 5th generation mobile communication technology (5G) network, the future evolved public land mobile network (PLMN), the Internet, or the like.

It should be noted that the application scenario shown in FIG. 1 is only an exemplary description and should not be regarded as a limitation of the protection scope of the present disclosure. For example, the image forming apparatus may be, in addition to a printer, a copier, a facsimile machine, a multifunctional image forming and copying apparatus, an electrostatic printing apparatus, and the like; different image forming apparatuses may also communicate through a public network; and other numbers of image forming apparatuses may also be included in a same local area network.

It can be understood that when the image forming apparatus needs to be upgraded, the supplier may store the firmware upgrade package in the supplier's server for users to download.

Normally, a supplier may provide services for various users, and each user may have multiple image forming apparatuses. Therefore, when there is a firmware upgrade package, a large number of image forming apparatuses may need to be upgraded simultaneously. At this point, if each image forming apparatus downloads the firmware upgrade package from the supplier's server, a large network bandwidth may be occupied.

In response to such problem, in embodiments of the present disclosure, the firmware upgrade package may be downloaded from the server through a specific image forming apparatus and then the firmware upgrade package may be distributed to other image forming apparatuses through such image forming apparatus, thereby reducing the download pressure on the server side and the network bandwidth problem, which is described in detail hereinafter.

Figure 2:
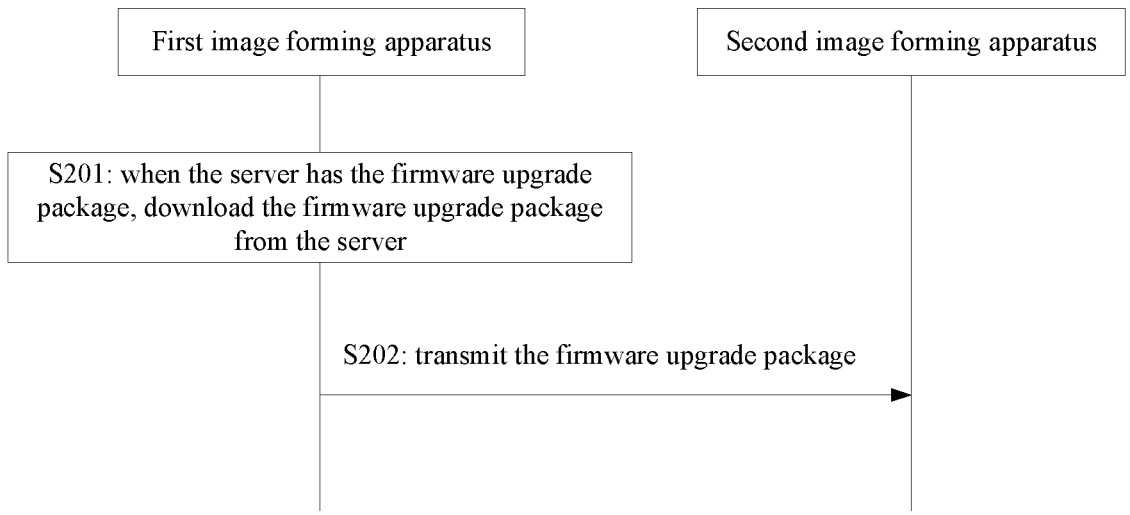
FIG. 2 illustrates a schematic flowchart of a firmware upgrade method provided by exemplary embodiments of the present disclosure.

FIG. 2 illustrates a schematic flowchart of a firmware upgrade method provided by exemplary embodiments of the present disclosure. The method as shown in FIG. 2 may be applied to the application scenario described in FIG. 1, which mainly includes the following steps.

At S201, when the server has a firmware upgrade package, the first image forming apparatus may download the firmware upgrade package from the server.

Specifically, when the firmware of the image forming apparatus needs to be upgraded, the supplier may store the firmware upgrade package in the server, and the first image forming apparatus may download the firmware upgrade package in the server.

The firmware to be upgraded may include, but not be limited to, upgrade firmware for the image forming apparatus's own functions (for example, adding a new secure transmission protocol), upgrade firmware for consumable control strategy (for example, upgrade firmware for consumable chip identification method), upgrade firmware for updating address book, upgrade firmware for updating network connection, upgrade firmware for updating hibernation control, and the like.

The first image forming apparatus may be any image forming apparatus in a preset image forming apparatus set. The image forming apparatus set may be image forming apparatuses in a same local area network, image forming apparatuses of a same user, or image forming apparatuses of a same office area, and the like, which may not be specifically limited in embodiments of the present disclosure.

When the server has a firmware upgrade package, the first image forming apparatus may download the firmware upgrade package in the server to perform firmware upgrade according to the firmware upgrade package.

In a specific implementation, the first image forming apparatus may inquire whether there is the firmware upgrade package in the server according to a preset time period; or when the server has the firmware upgrade package, the server may actively transmit a notification message to the first image forming apparatus and inform the first image forming apparatus that the server has the firmware upgrade package through the notification message.

At S202, the first image forming apparatus may transmit the firmware upgrade package to the second image forming apparatus.

Specifically, the second image forming apparatus may be another image forming apparatus other than the first image forming apparatus in the preset image forming apparatus set. After the first image forming apparatus downloads the firmware upgrade package in the server, the firmware upgrade package may be transmitted to another image forming apparatus in the image forming apparatus set, that is, the second image forming apparatus.

In embodiments of the present disclosure, after downloading the firmware upgrade package in the server, the first image forming apparatus may forward the firmware upgrade package to the second image forming apparatus, which may avoid that all image forming apparatuses download the firmware upgrade package on the server side and reduce the network bandwidth occupation on the server side.

For convenience of description, the first image forming apparatus is defined as a master image forming apparatus, and the second image forming apparatus is defined as a slave image forming apparatus. The master image forming apparatus may obtain the firmware upgrade package from the server, and the slave image forming apparatus may obtain the firmware upgrade package from the master image forming apparatus.

It can be understood that the number of slave image forming apparatuses may be two or more, and the master image forming apparatus may transmit the firmware upgrade package to two or more slave image forming apparatuses, respectively.

Normally, any image forming apparatus in the image forming apparatus set may be selected as the master image forming apparatus, and other image forming apparatuses may be selected as the slave image forming apparatuses. However, to achieve a desirable effect, it may configure a firmware download priority for each image forming apparatus and determine the master image forming apparatus and the slave image forming apparatus by comparing the firmware download priorities of the image forming apparatuses, where the firmware download priority of the master image forming apparatus is higher than the firmware download priority of the slave image forming apparatus. That is, the image forming apparatus with the highest firmware download priority may be selected as the master image forming apparatus.

The firmware download priority may be determined by dynamic comparison with own attributes of the plurality of image forming apparatuses or may be determined in combination with a preset priority order. During a using process, if the position of the image forming apparatus is changed, or one or more image forming apparatuses are added or removed from the image forming apparatus set, it may also quickly determine one image forming apparatus as the master image forming apparatus according to the firmware download priority, without the need to perform differentiated role settings for the image forming apparatuses in advance, which may increase the versatility of the image forming apparatuses.

In an optional embodiment, the determination condition for the firmware download priority may be media access control (MAC) address priority. Exemplarily, the determination manner for the MAC address priority may be that: the comparison may start from the highest bit of the MAC address; if they are numbers, the smaller number goes first; if they are letters, a preceding letter goes first; if it is a comparison between a number and a letter, the number goes first; and if the highest bits are same, next bits are compared; and so on.

For example, the MAC addresses of the first image forming apparatus, the second image forming apparatus and the third image forming apparatus are respectively: MAC1: 3ABDCBADDDFF; MAC2: ADBDCBADDDFF; and MAC3: AABDCBADDDFF. According to the above-mentioned determination rule, the MAC address priority of the first image forming apparatus is ranked first, the MAC address priority of the second image forming apparatus is ranked third, and the MAC address priority of the third image forming apparatus is ranked second.

It should be noted that determining the firmware download priority using the MAC address priority may only be a possible implementation manner listed in embodiments of the present disclosure, and those skilled in the art may make corresponding adjustments according to actual needs. For example, in addition to the MAC address, the firmware download priority may be determined by conditions such as the image forming apparatus's serial number SN, network transmission speed, remaining service life, idle rate, and/or distance from a network access point.

When the network transmission speed is used as the determination condition for the firmware download priority, current network transmission speeds of all image forming apparatuses may be compared, the image forming apparatus with the fastest network communication speed may be used as the master image forming apparatus, and other image forming apparatuses may be used as slave image forming apparatuses. Such solution may facilitate the image forming apparatus to complete receiving the firmware upgrade package more quickly.

When the remaining service life is used as the determination condition for the firmware download priority, the service life of all image forming apparatuses may be compared, the latest image forming apparatus (i.e., the longest remaining service life) may be used as the master image forming apparatus, and other image forming apparatuses may be used as slave image forming apparatuses. In the case of a same model, the latest image forming apparatus, which may have the best performance, has a higher success rate in successfully receiving the firmware upgrade package.

When the idle rate is used as the determination condition for the firmware download priority, the idle rates of all image forming apparatuses may be compared, the image forming apparatus with the highest idle rate may be used as the master image forming apparatus, and other image forming apparatuses may be used as slave image forming apparatuses. Such manner may improve the utilization rate of the image forming apparatus with the highest idle rate and reduce the inconvenience caused by the firmware upgrade to the user as possible.

When the distance from the network access point is used as the determination condition for the firmware download priority, the distances between all image forming apparatuses and the network access point may be compared, the image forming apparatus closest to the network access point (for example, a router) may be the master image forming apparatus, and other image forming apparatuses may be the slave image forming apparatuses. The master image forming apparatus selected by such manner may be less likely to be affected by the network during the process of receiving the firmware upgrade package.

It can be understood that, in practical application scenarios, a same local area network may include a variety of different image forming apparatuses. For image forming apparatuses of a same model, a same firmware upgrade package may normally be used for upgrading simultaneously; and for image forming apparatuses of different models, the firmware upgrade time or firmware upgrade packages may normally be different.

Figure 3:
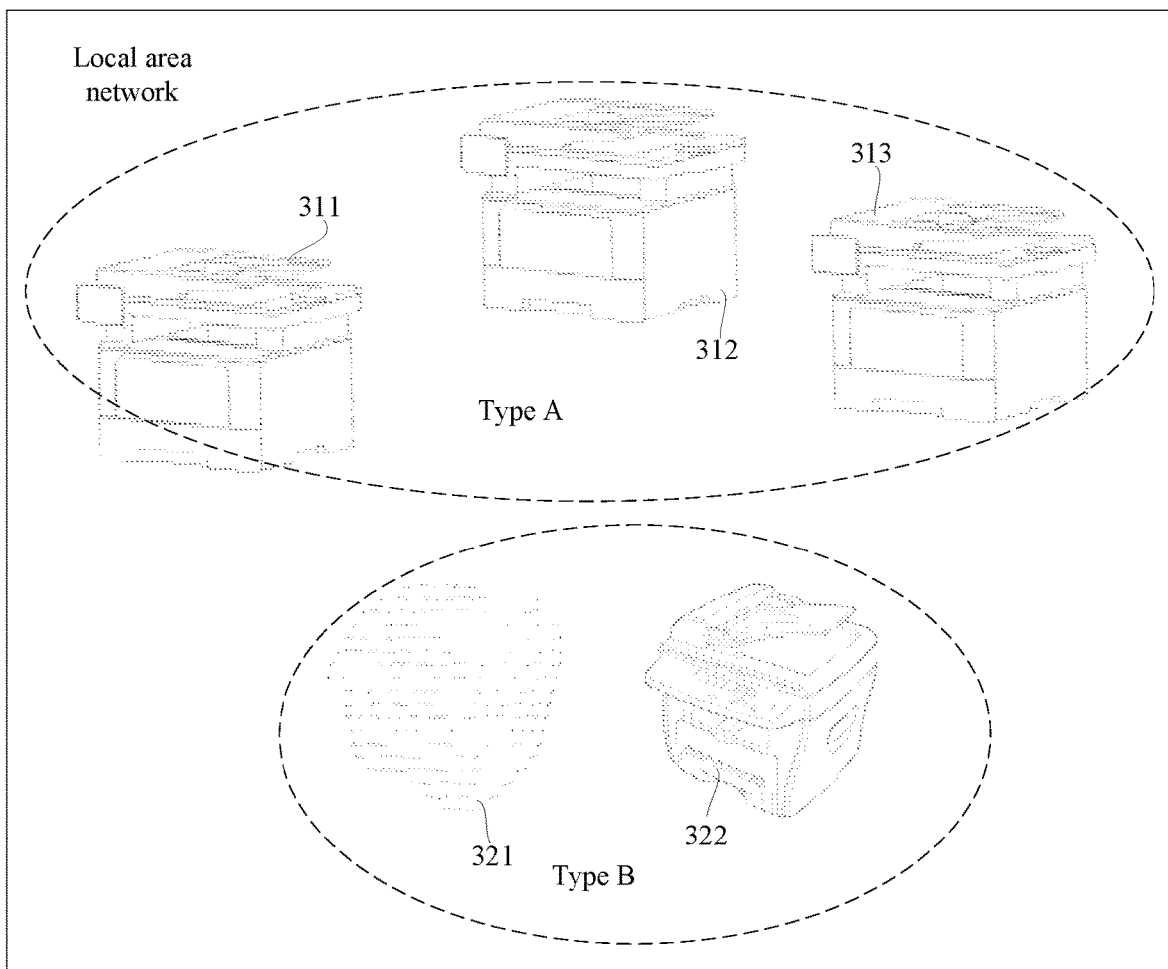
FIG. 3 illustrates a schematic of another application scenario provided by exemplary embodiments of the present disclosure.

Referring to FIG. 3, FIG. 3 illustrates a schematic of another application scenario provided by exemplary embodiments of the present disclosure. Five image forming apparatuses are shown in FIG. 3; and five image forming apparatuses may include two models which are a model A and a model B, respectively, where the image forming apparatuses 311, 312 and 313 may be the model A, and the image forming apparatuses 321 and 322 may be the model B.

It can be understood that the image forming apparatuses 311, 312 and 313 of the same model A may normally be upgraded using a same firmware upgrade package; and the image forming apparatuses 321 and 322 of the same model B may normally be upgraded using a same firmware upgrade package. Therefore, when the firmware upgrade is performed, the image forming apparatuses of a same model may be configured as one image forming apparatus set, and the master image forming apparatus and the slave image forming apparatus may be determined in the image forming apparatus set; then, according to the method described in FIG. 2, the master image forming apparatus may download the firmware upgrade package in the server, and the slave image forming apparatus may download the firmware upgrade package in the master image forming apparatus.

That is, in embodiments shown in FIG. 2, the first image forming apparatus and the second image forming apparatus may be a same model. In addition, if there are a plurality of first image forming apparatuses of different models and a plurality of second image forming apparatuses of different models, the plurality of first image forming apparatuses of different models may, according to a preset priority order, determine an order in which the plurality of first image forming apparatuses of different models download firmware upgrade packages from the server. The determination condition for the preset priority order may include a MAC address priority, a serial number priority, a network transmission speed, a remaining service life, an idle rate, and/or a distance from the network access point. It should be noted that the manner for determining the plurality of first image forming apparatuses of different models may be exactly same, or partially same, or completely different from the determination condition for the plurality of image forming apparatuses of the same model to determine the master image forming apparatus, which may not be specifically limited in the present disclosure.

For example, the image forming apparatuses 311, 312, and 313 may be the same model; and the image forming apparatuses 311, 312, and 313 may be configured as the first image forming apparatus set; and according to the firmware download priority, in the first image forming apparatus set, the image forming apparatus 311 may be determined as the master image forming apparatus, and the image forming apparatuses 312 and 313 may be determined as the slave image forming apparatuses. When the firmware upgrade is performed, the image forming apparatus 311 may download the firmware upgrade package from the server, and the image forming apparatuses 312 and 313 may download the firmware upgrade package from the image forming apparatus 311.

Figure 4:
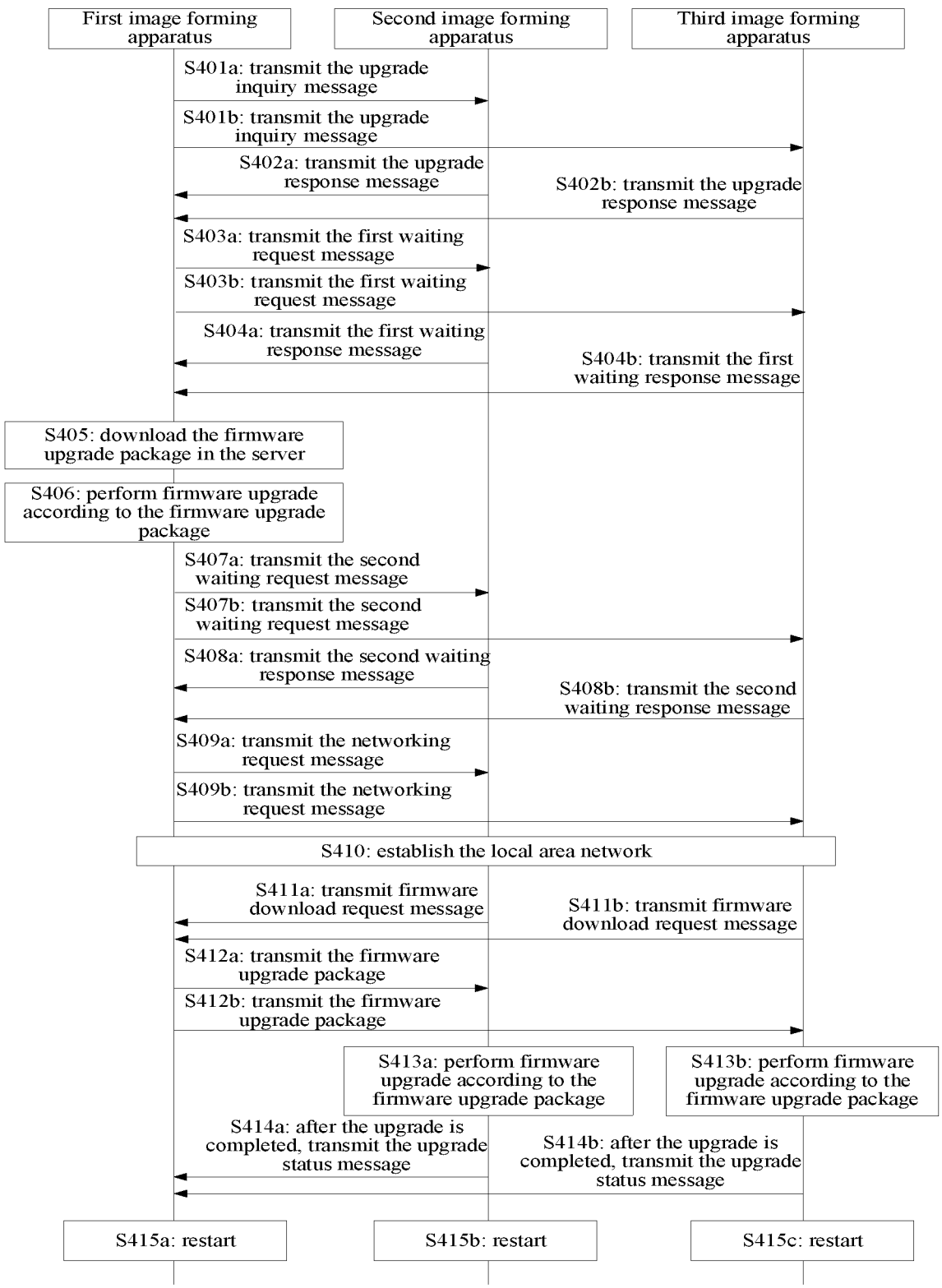
FIG. 4 illustrates a schematic flowchart of another firmware upgrade method provided by exemplary embodiments of the present disclosure.

Referring to FIG. 4, FIG. 4 illustrates a schematic flowchart of another firmware upgrade method provided by exemplary embodiments of the present disclosure. The method may be applied to the application scenario described in FIG. 1; and the example shown in FIG. 4 may include three image forming apparatuses, that is, the first image forming apparatus, the second image forming apparatus, and the third image forming apparatus.

At S401, the first image forming apparatus may transmit an upgrade inquiry message to the second image forming apparatus and the third image forming apparatus, respectively.

It can be understood that any one of the three image forming apparatuses may be used as the master image forming apparatus, and other two image forming apparatuses may be used as slave image forming apparatuses. Exemplarily, in embodiments of the present disclosure, the first image forming apparatus may be configured as the master image forming apparatus, and the second image forming apparatus and the third image forming apparatus may be configured as slave image forming apparatuses.

Specifically, S401 may include S401a and S401b. At S401a, the first image forming apparatus may transmit an upgrade inquiry message to the second image forming apparatus; and at S401b, the first image forming apparatus may transmit an upgrade inquiry message to the third image forming apparatus. The upgrade inquiry message may be configured to characterize the inquiry that whether the second image forming apparatus and the third image forming apparatus need to perform the firmware upgrade.

In practical applications, the upgrade query message may be a broadcast message; and the broadcast message may include the model, MAC address, role label and latest firmware version of the first image forming apparatus and may be configured to obtain a list of image forming apparatuses which need the firmware upgrade, where the role label may be the master image forming device. Obviously, those skilled in the art may also use a unicast or multicast manner to transmit the upgrade query message, which may not be specifically limited in embodiments of the present disclosure.

In a possible implementation manner, the first image forming apparatus may also receive upgrade inquiry messages transmitted by other image forming apparatuses; the first image forming apparatus may compare its firmware download priority with the firmware download priorities of the other image forming apparatuses; if the firmware download priority of the first image forming apparatus is higher than that of other image forming apparatuses, the role label of the first image forming apparatus may be configured as the master image forming apparatus; on the contrary, if the firmware download priority of the first image forming apparatus is lower than the firmware download priority of other image forming apparatuses, the role label of the first image forming apparatus may be configured to the slave image forming apparatus.

At S402, the second image forming apparatus and the third image forming apparatus may respectively transmit an upgrade response message to the first image forming apparatus.

Specifically, S402 may include S402a and S402b. At S402a, the second image forming apparatus may transmit an upgrade response message to the first image forming apparatus; and at S402b, the third image forming apparatus may transmit an upgrade response message to the first image forming apparatus.

The upgrade response message may include upgrade approval response information or upgrade rejection response information, where the upgrade approval response information may be configured to characterize that the second image forming apparatus and/or the third image forming apparatus may agree to be upgraded; and the upgrade rejection response information may be configured to characterize that the second image forming apparatus and/or the third image forming apparatus may reject the upgrade.

Exemplarily, if the second image forming apparatus is an image forming apparatus newly purchased by the user, its firmware may already be the latest version and may not need to be upgraded, so the upgrade may be rejected; or the second image forming apparatus may reject the upgrade because special operation is configured or high security requirement does not allow network upgrade.

In practical applications, the upgrade response message may be a broadcast message; and the broadcast message may include the model, MAC address and role label of the second image forming apparatus or the third image forming apparatus, where the role label is the slave image forming apparatus. Obviously, those skilled in the art may also use a unicast or multicast manner to transmit the upgrade response message, which may not be specifically limited in embodiments of the present disclosure.

It should be noted that, in some possible embodiments, it may be assumed that all image forming apparatuses need to be upgraded. Therefore, steps S401 and S402 may be omitted; and upgrade inquiry and response may not be needed between the master image forming apparatus and the slave image forming apparatus.

At S403, the first image forming apparatus may transmit the first waiting request message to the second image forming apparatus and the third image forming apparatus, respectively.

After it determines that the firmware upgrade package is downloaded in the server through the first image forming apparatus, to prevent the second image forming apparatus and the third image forming apparatus from initiating the download request of the firmware upgrade package to the server, the first image forming apparatus may transmit the first waiting request message to the second image forming apparatus and the third image forming apparatus, respectively; and the first waiting request message may be configured to instruct the second image forming apparatus and the third image forming apparatus to wait for the first image forming apparatus to transmit the firmware upgrade package.

Specifically, S403 may include S403a and S403b. At S403a, the first image forming apparatus may transmit the first waiting request message to the second image forming apparatus; and at S403b, the first image forming apparatus may transmit the first waiting request message to the third image forming apparatus.

In practical applications, the first waiting request message may be a broadcast message; and the broadcast message may include the model, MAC address and role label of the first image forming apparatus, where the role label may be the master image forming apparatus. Obviously, those skilled in the art may also use a unicast or multicast manner to transmit the upgrade response message (or the first waiting request message), which may not be specifically limited in embodiments of the present disclosure.

At S404, the second image forming apparatus and the third image forming apparatus may respectively transmit the first waiting response message to the first image forming apparatus.

After receiving the first waiting request message transmitted by the first image forming apparatus, the second image forming apparatus and the third image forming apparatus may respectively transmit the first waiting response message to the first image forming apparatus; and the first waiting response message may be configured to indicate that the second image forming apparatus and the third image forming apparatus have received the first waiting request message.

Specifically, S404 may include S404a and S404b. At S404a, the second image forming apparatus may transmit the first waiting response message to the first image forming apparatus; and at S404b, the third image forming apparatus may transmit the first waiting response message to the first image forming apparatus.

In practical applications, the first waiting response message may be a broadcast message; and the broadcast message may include the model, MAC address and role label of the second image forming apparatus and/or the third image forming apparatus, where the role label may be the slave image forming apparatus. Obviously, those skilled in the art may also use a unicast or multicast manner to transmit the upgrade response message (or the first waiting request message), which may not be specifically limited in embodiments of the present disclosure.

It should be noted that, in some possible embodiments, S404 may be omitted; and after the first image forming apparatus transmits the first waiting request message, both the second image forming apparatus and the third image forming apparatus may receive the first waiting request message by default.

Obviously, steps S404 and S404 may also both be omitted, and all slave image forming apparatuses may not request the server to download the firmware upgrade package.

At S405, the first image forming apparatus may download the firmware upgrade package from the server.

In practical applications, there may be a plurality of master image forming apparatuses that need to download firmware upgrade packages simultaneously, and the plurality of master image forming apparatuses may need to be queued for downloading according to the order. Specifically, the first image forming apparatus may transmit a queue request; and other master image forming apparatuses may transmit upgrade status messages in response to the queue request. The upgrade status may include downloading, queueing/waiting, and the like.

If the first image forming apparatus does not receive the upgrade status message or determines that there is no image forming apparatus that is currently downloading or queueing and waiting according to received upgrade status message, the firmware upgrade package in the server may start to be downloaded; if the first image forming apparatus determines that there is currently an image forming apparatus that is downloading or queueing and waiting according to received upgrade status message, the current status may be configured to be queueing and waiting, the state of a preceding image forming apparatus may be detected at a preset time period, and the first image forming apparatus may start downloading after the preceding image forming apparatus completes the downloading. In an optional embodiment, the queueing order of the image forming apparatuses may be configured according to priority, which may not be described herein.

At S406, the first image forming apparatus may perform the firmware upgrade according to the firmware upgrade package.

After the first image forming apparatus completes downloading the firmware upgrade package, it may save the firmware upgrade package and start the upgrade. Obviously, the first image forming apparatus may also perform the firmware upgrade after the firmware upgrade package has been distributed, which may not be limited in embodiments of the present disclosure.

At S407, the first image forming apparatus may transmit the second waiting request message to the second image forming apparatus and the third image forming apparatus, respectively.

In practical applications, since the firmware upgrade process of the first image forming apparatus may take a long time, during this time period, in order to avoid the second image forming apparatus and the third image forming apparatus from initiating the firmware upgrade package download request to the server, the first image forming apparatus may transmit the second waiting request message to the second image forming apparatus and the third image forming apparatus, respectively; and the second waiting request message may be configured to instruct the second image forming apparatus and the third image forming apparatus to wait for the first image forming apparatus to transmit the firmware upgrade package.

Specifically, S407 may include S407a and S407b. At S407a, the first image forming apparatus may transmit the second waiting request message to the second image forming apparatus; and at S407b, the first image forming apparatus may transmit the second waiting request message to the third image forming apparatus.

Specific description may refer to the above-mentioned S403, which may not be described herein.

At S408, the second image forming apparatus and the third image forming apparatus may respectively transmit the second waiting response message to the first image forming apparatus.

Specifically, S408 may include S408a and S408b. At S408a, the second image forming apparatus may transmit the second waiting response message to the first image forming apparatus; and at S408b, the third image forming apparatus may transmit the second waiting response message to the first image forming apparatus.

Specific description may refer to the above-mentioned S404, which may not be described herein.

At S409, the first image forming apparatus may transmit a networking request message to the second image forming apparatus and the third image forming apparatus, respectively.

To avoid occupying the original network bandwidth, the first image forming apparatus, the second image forming apparatus and the third image forming apparatus may establish a local area network by themselves and transmit the firmware upgrade package through established local area network.

Specifically, S409 may include S409a and S409b. At S409a, the first image forming apparatus may transmit a networking request message to the second image forming apparatus; and at S409b, the first image forming apparatus may transmit a networking request message to the third image forming apparatus.

In practical applications, the networking request message may be a broadcast message, and the broadcast message may include a service set identifier SSID and a password of a hotspot shared by the first image forming apparatus. Obviously, those skilled in the art may also use a unicast or multicast manner to transmit the networking request message, which may not be specifically limited in embodiments of the present disclosure.

At S410, a local area network may be established between the first image forming apparatus, the second image forming apparatus, and the third image forming apparatus.

The second image forming apparatus and the third image forming apparatus may be connected to the hot spot shared by the first image forming apparatus, and the local area network may be established between the first image forming apparatus, the second image forming apparatus, and the third image forming apparatus.

It should be noted that, in an optional embodiment, the local area network may not be established between the first image forming apparatus, the second image forming apparatus, and the third image forming apparatus, but the transmission of the firmware upgrade package may be performed through the original network. That is, steps S409 and S410 may be omitted.

At S411, the second image forming apparatus and the third image forming apparatus may respectively transmit a firmware download request message to the first image forming apparatus.

After the local area network is established between the first image forming apparatus, the second image forming apparatus, and the third image forming apparatus, the second image forming apparatus and the third image forming apparatus may respectively transmit the firmware download request message to the first image forming apparatus through the local area network; and the firmware download request message may be configured to characterize the request for downloading the firmware upgrade package in the first image forming apparatus.

Specifically, S411 may include S411a and S411b. At S411a, the second image forming apparatus may transmit the firmware download request message to the first image forming apparatus; and at S411b, the third image forming apparatus may transmit the firmware download request message to the first image forming apparatus.

In practical applications, the firmware download request message may be a unicast message, where the firmware download request message transmitted by the second image forming apparatus may include the model, MAC address and role label of the second image forming apparatus; and the role label of the second image forming apparatus may be a slave image forming apparatus. The firmware download request message transmitted by the third image forming apparatus may include the model, MAC address and role label of the third image forming apparatus; and the role label of the third image forming apparatus may be a slave image forming apparatus. Obviously, those skilled in the art may also transmit the firmware download request message in a broadcast or multicast manner, which may not be specifically limited in embodiments of the present disclosure.

It should be noted that, in some possible embodiments, S411 may be omitted, and after completing downloading of the firmware upgrade package, the first image forming apparatus may actively transmit the firmware upgrade package to the second image forming apparatus and the third image forming apparatus.

At S412, the first image forming apparatus may transmit the firmware upgrade package to the second image forming apparatus and the third image forming apparatus, respectively.

After receiving the firmware download request messages transmitted by the second image forming apparatus and the third image forming apparatus, the first image forming apparatus may transmit the firmware upgrade package to the second image forming apparatus and the third image forming apparatus, respectively.

Specifically, S412 may include S412a and S412b. Ats S412a, the first image forming apparatus may transmit the firmware upgrade package to the second image forming apparatus; and at S412b, the first image forming apparatus may transmit the firmware upgrade package to the third image forming apparatus.

In practical applications, in one embodiment, "transmitting the firmware upgrade package" may be transmitting the firmware upgrade package in a broadcast manner. Obviously, those skilled in the art may also use a unicast or multicast manner to transmit the firmware upgrade package, which may not be specifically limited in embodiments of the present disclosure. In addition, in other communication processes in one embodiment, for example, "firmware upgrade package", upgrade inquiry message, upgrade response message, waiting request, waiting response, ad hoc network connection request, queuing request, upgrade status message, upgrade status, and the like may not be limited to the broadcast packet.

At S413, the second image forming apparatus and the third image forming apparatus may respectively perform the firmware upgrade according to the firmware upgrade package.

Specifically, S413 may include S413a and S413b. At S413a, the second image forming apparatus may perform the firmware upgrade according to the firmware upgrade package; and at S413b, the third image forming apparatus may perform the firmware upgrade according to the firmware upgrade package.

At S414, after the upgrade is completed, the second image forming apparatus and the third image forming apparatus may transmit an upgrade status message to the first image forming apparatus respectively.

After the upgrade is completed, the second image forming apparatus and the third image forming apparatus may respectively transmit the upgrade status message to the first image forming apparatus to notify the first image forming apparatus that the upgrade has been completed. In some optional embodiments, the second image forming apparatus and the third image forming apparatus may notify the first image forming apparatus of the upgrade status according to a preset time period.

Specifically, S414 may include S414a and S414b. At S414a, after the upgrade is completed, the second image forming apparatus may transmit the upgrade status message to the first image forming apparatus; and at S414b, after the upgrade is completed, the third image forming apparatus may transmit the upgrade status message to the first image forming apparatus.

In practical applications, the upgrade status message may be a broadcast message, a multicast message, a unicast message, or the like, which may not be specifically limited in embodiments of the present disclosure.

At S415, the first image forming apparatus, the second image forming apparatus, and the third image forming apparatus may restart respectively.

When the upgrade is completed, all the image forming apparatuses may be individually restarted. Specifically, S415 may include steps S415a, S415b, and S415c. At S415a, the first image forming apparatus may be restarted; at S415b, the second image forming apparatus may be restarted; and at S415c, the third image forming apparatus may be restarted.

It should be noted that the second image forming apparatus and the third image forming apparatus are slave image forming apparatuses and may be restarted respectively after completing the upgrade. The first image forming apparatus is the master image forming apparatus and may need to be restarted after completing the upgrade of all image forming apparatuses, thereby avoiding affecting the upgrade of other image forming apparatuses during the restarting process.

In embodiments of the present disclosure, after downloading the firmware upgrade package from the server, the master image forming apparatus may forward the firmware upgrade package to other slave image forming apparatuses, which may avoid that all image forming apparatuses download the firmware upgrade package on the server side, thereby reducing the network bandwidth occupation on the server side.

In some possible implementation manners, the master image forming apparatus may transmit the firmware upgrade package to the plurality of slave image forming apparatuses in a parallel or serial manner; or the firmware upgrade package may be forwarded between image forming apparatuses, which may not be limited in embodiments of the present disclosure. For example, after receiving the firmware upgrade package transmitted by the first image forming apparatus, the second image forming apparatus may forward the firmware upgrade package to the fourth image forming apparatus.

In some possible implementation manners, a same image forming apparatus may also receive multiple firmware upgrade packages. For example, the second image forming apparatus may receive the first firmware upgrade package transmitted by the first image forming apparatus and the second firmware upgrade package transmitted by the third image forming apparatus, respectively. For differentiation, a time stamp may be added to the firmware upgrade package when the firmware upgrade package is transmitted. Specifically, the first firmware upgrade package may include the first time stamp, and the second firmware upgrade package may include the second time stamp. The second image forming apparatus may determine which firmware upgrade package is used for upgrade by comparing time stamps. Specifically, if the first time stamp is earlier than the second time stamp, the firmware upgrade may be performed according to the first firmware upgrade package; and if the first time stamp is later than the second time stamp, firmware upgrade may be performed according to the second firmware upgrade package.

Figure 5:
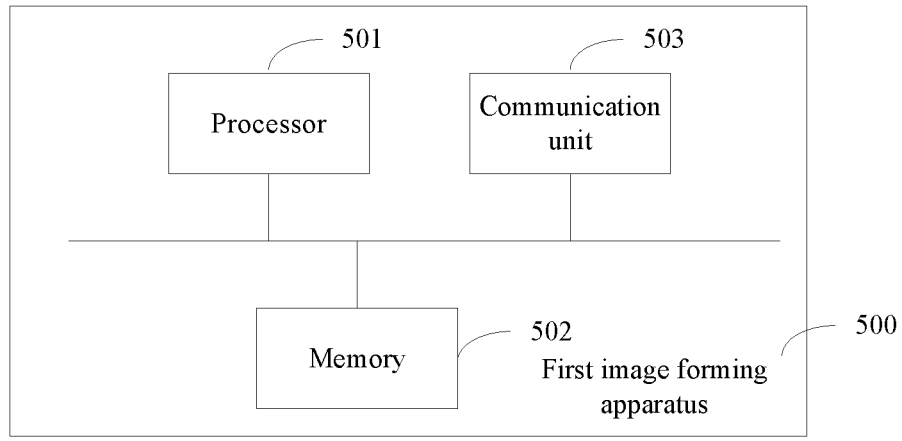
FIG. 5 illustrates a structural schematic of a first image forming apparatus provided by exemplary embodiments of the present disclosure.

Referring to FIG. 5, FIG. 5 illustrates a structural schematic of the first image forming apparatus provided by exemplary embodiments of the present disclosure. The first image forming apparatus 500 may include a processor 501, a memory 502, and a communication unit 503. These components may communicate over one or more buses. Those skilled in the art can understand that the structure of the server shown in FIG. 5 may not be a limitation on embodiments of the present disclosure, which may be a bus-shaped structure or a star-shaped structure, may also include more or fewer components than shown in FIG. 5, may combine certain components or have different component arrangements.

The communication unit 503 may be configured to establish a communication channel, so that the storage device may communicate with other devices to receive user data transmitted by other devices or transmit user data to other devices.

The processor 501 may be the control center of the storage device and use various interfaces and lines to connect various parts of the entire system; and various functions of the system may be performed and/or data may be processed by running or executing software programs and/or modules stored in the memory 502 and invoking the data stored in the memory. The processor may be made of integrated circuit(s) (IC), for example, made of a single packaged IC or a plurality of packaged ICs with a same function or different functions.

The memory 502 may be configured to store execution instructions of the processor 501. The memory 502 may be implemented by combining any type of volatile or non-volatile storage device or combination thereof, such as static random-access memory (SRAM), electrically erasable programmable read only memory (EEPROM), erasable programmable read only memory (EPROM), programmable read only memory (PROM), read only memory (ROM), magnetic memory, flash memory, a magnetic disk, or an optical disk.

When the execution instructions in the memory 502 are executed by the processor 501, the first image forming apparatus 500 may execute a part or all steps on the first image forming apparatus side, for example, the master image forming apparatus side, in the above-mentioned method embodiments.

Figure 6:
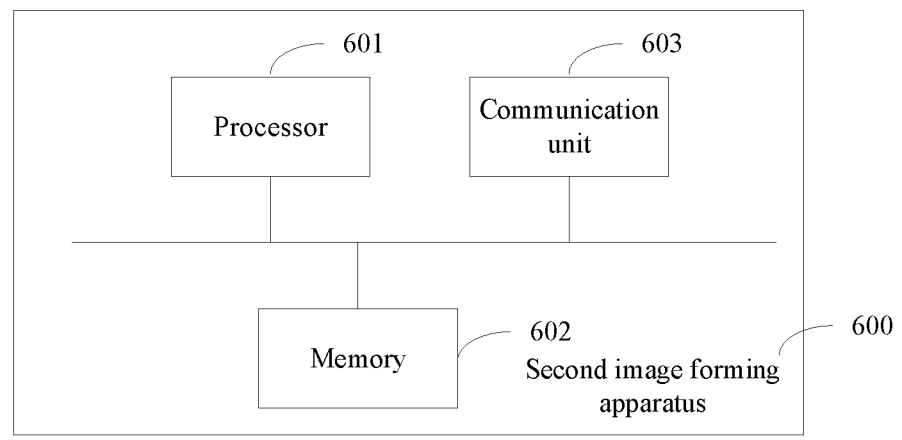
FIG. 6 illustrates a structural schematic of a second image forming apparatus provided by exemplary embodiments of the present disclosure.

Referring to FIG. 6, FIG. 6 illustrates a structural schematic of the second image forming apparatus provided by exemplary embodiments of the present disclosure. The second image forming apparatus 600 may include a processor 601, a memory 602, and a communication unit 603. These components may communicate over one or more buses. Those skilled in the art can understand that the structure of the server shown in FIG. 6 may not be a limitation on embodiments of the present disclosure, which may be a bus-shaped structure or a star-shaped structure, also include more or fewer components than shown in FIG. 6, may combine certain components or have different component arrangements.

The communication unit 603 may be configured to establish a communication channel, so that the storage device may communicate with other devices to receive user data transmitted by other devices or transmit user data to other devices.

The processor 601 may be the control center of the storage device and use various interfaces and lines to connect various parts of the entire system; and various functions of the system may be performed and/or the data may be processed by running or executing software programs and/or modules stored in the memory 602 and invoking the data stored in the memory. The processor may be made of integrated circuit(s) (IC), for example, made of a single packaged IC or a plurality of packaged ICs with a same function or different functions.

The memory 602 may be configured to store execution instructions of the processor 601. The memory 602 may be implemented by combining any type of volatile or non-volatile storage device or combination thereof, such as static random-access memory (SRAM), electrically erasable programmable read only memory (EEPROM), erasable programmable read only memory (EPROM), programmable read only memory (PROM), read only memory (ROM), magnetic memory, flash memory, a magnetic disk, or an optical disk.

When the execution instructions in the memory 602 are executed by the processor 601, the first image forming apparatus 600 may execute a part or all steps on the first image forming apparatus side, for example, the master image forming apparatus side, in the above-mentioned method embodiments.

Corresponding to the above-mentioned embodiments, embodiments of the present disclosure further provide a firmware upgrade system. The firmware upgrade system may include the above-mentioned first image forming apparatus and the second image forming apparatus; and the first image forming apparatus and the second image forming apparatus may be communicatively connected, where the number of the first image forming apparatus and the second image forming apparatus may be two or more, which may not be limited in embodiments of the present disclosure.

In a specific implementation, the present disclosure further provides a computer storage medium, where the computer storage medium may store a program, and when being executed, the program may include some or all steps in various embodiments provided in the present disclosure. The above-mentioned storage medium may be a magnetic disk, an optical disc, read-only memory (ROM) or random-access memory (RAM).

In a specific implementation, embodiments of the present disclosure further provide a computer program product. The computer program product may include executable instructions, and when the executable instructions are executed on a computer, the computer may execute some or all steps in the above-mentioned method embodiments.

In embodiments of the present disclosure, "at least one" refers to one or more, and "the plurality of" refers to two or more. "And/or" may describe the association relationship of the associated objects, indicating that there can be three types of relationships. For example, A and/or B may indicate the situations where A exists alone, A and B exist at the same time, and B exists alone, where A and B may be singular or plural. The character "/" may normally indicate that the associated objects before and after are in an "or" relationship. "The following at least one item" and similar expressions may refer to any combination of these items, including any combination of singular items or plural items. For example, at least one of a, b, and c may indicate: a, b, c, a-b, a-c, b-c, or a-b-c, where a, b, and c can be singular or plural.

Those skilled in the art should be noted that the units and algorithm steps described in embodiments disclosed in the present disclosure may be implemented by a combination of electronic hardware, computer software, and electronic hardware. Whether these functions are executed by hardware or software may depend on specific applications and design constraint conditions of the technical solutions. Those skilled in the art may use different manners for each specific application to implement the described functions, but such implementation should not be considered as beyond the scope of the present disclosure.

Those skilled in the art may clearly understand that, for the convenience and conciseness of the description, the specific working process of the system, apparatus and unit described above may refer to the corresponding process in above-mentioned method embodiments, which may not be described in detail herein.

The above are only specific embodiments of the present disclosure. Changes or substitutions which may be easily thought by those skilled in the art within the technical scope disclosed by the present disclosure should be covered by the protection scope of the present disclosure. The protection scope of the present disclosure shall be subject to the protection scope of the claims.

What is claimed is:
1. A firmware upgrade method, applied to a first image forming apparatus, the method comprising:
acquiring one or more preset role settings from a plurality of image forming apparatuses;
selecting a first master image forming apparatus, from the plurality of image forming apparatuses, as a master image forming apparatus according to a preset role setting of the first image forming apparatus corresponding to a preset firmware download priority that is higher than preset firmware download priorities of other image forming apparatuses in the plurality of image forming apparatuses;
designating a second image forming apparatuses, from the plurality of image forming apparatuses, as a slave image forming apparatus according to a preset role setting of the second image forming apparatus corresponding to a respective preset firmware download priority;
when a server has a firmware upgrade package, downloading the firmware upgrade package to the master image forming apparatus from the server;
transmitting, from the master image forming apparatus, the firmware upgrade package to the slave image forming apparatus, wherein the firmware upgrade package is configured to upgrade firmware of the master image forming apparatus and the slave image forming apparatus;
when any of the first image forming apparatus or the second image forming apparatus is moved to a new location, obtaining a firmware download priority for the first image forming apparatus and a firmware download priority for the second image forming apparatus based on attributes of the first image forming apparatus and attributes of the second image forming apparatus in relation to the new location of each of the first image forming apparatus and the second image forming apparatus; and when the firmware download priority of the second image forming apparatus is higher than the firmware download priority of the first image forming apparatus, changing the second image forming apparatus to the master image forming apparatus, and changing the first image forming apparatus to the slave image forming apparatuses without differentiating the preset role setting of the first image forming apparatus and the preset role setting of the second image forming apparatus.

2. The method according to claim 1, further comprising setting the preset firmware download priority according to:
a media access control (MAC) address priority, a serial number priority, a network transmission speed, a remaining service life, an idle rate, and/or a distance from a network access point.

3. The method according to claim 1, wherein the first image forming apparatus and the second image forming apparatus are of a same model.

4. The method according to claim 1, before transmitting, from the master image forming apparatus, the firmware upgrade package to the slave image forming apparatus, further including:
transmitting an upgrade inquiry message to the second image forming apparatus, wherein the upgrade inquiry message is configured to characterize an inquiry that whether the second image forming apparatus needs to perform firmware upgrade; and
receiving an upgrade response message transmitted by the second image forming apparatus, wherein the upgrade response message includes upgrade approval response information or upgrade rejection response information.

5. The method according to claim 1, further including:
transmitting a waiting request message to the second image forming apparatus, wherein the waiting request message is configured to instruct the second image forming apparatus to wait for the first image forming apparatus to transmit the firmware upgrade package.

6. The method according to claim 5, wherein the waiting request message includes a first waiting request message and a second waiting request message, and transmitting the waiting request message to the second image forming apparatus includes:
before downloading the firmware upgrade package in the server, transmitting the first waiting request message to the second image forming apparatus; and
after downloading the firmware upgrade package in the server, transmitting the second waiting request message to the second image forming apparatus.

7. The method according to claim 1, before transmitting, from the master image forming apparatus, the firmware upgrade package to the slave image forming apparatus, further including:
transmitting a networking request message to the second image forming apparatus, wherein the networking request message is configured to characterize that the first image forming apparatus requests to establish a local area network with the second image forming apparatus; and
establishing the local area network with the second image forming apparatus.

8. The method according to claim 1, before transmitting, from the master image forming apparatus, the firmware upgrade package to the slave image forming apparatus, further comprising:
adding a time stamp to the firmware upgrade package.

9. A firmware upgrade method, applied to a second image forming apparatus, the method comprising:
acquiring one or more preset role settings from a plurality of image forming apparatuses;
selecting a first image forming apparatus, from the plurality of image forming apparatuses, as a master image forming apparatus according to a preset role setting of the first image forming apparatus corresponding to a preset firmware download priority that is higher than preset firmware download priorities of other image forming apparatuses in the plurality of image forming apparatuses;
designating the second image forming apparatus, from the plurality of image forming apparatuses, as a slave image forming apparatus according to a preset role setting of the second image forming apparatus corresponding to a preset firmware download priority of the second image forming apparatus;
downloading a firmware upgrade package in the server to the master image forming apparatus;
receiving the firmware upgrade package transmitted by the master image forming apparatus to the slave image forming apparatus;
performing firmware upgrade according to the firmware upgrade package;
when any of the first image forming apparatus or the second image forming apparatus is moved to a new location, obtaining a firmware download priority for the first image forming apparatus and a firmware download priority for the second image forming apparatus based on attributes of the first image forming apparatus and attributes of the second image forming apparatus in relation to the new location of each of the first image forming apparatus and the second image forming apparatus; and
when the firmware download priority of the second image forming apparatus is higher than the firmware download priority of the first image forming apparatus, changing the second image forming apparatus to the master image forming apparatus, and changing the first image forming apparatus to the slave image forming apparatus without differentiating the preset role setting of the first image forming apparatus and the preset role setting of the second image forming apparatus.

10. The firmware upgrade method according to claim 9, before receiving the firmware upgrade package transmitted by the master image forming apparatus to the slave image forming apparatus, further including:
receiving an upgrade inquiry message transmitted by the first image forming apparatus, wherein the upgrade inquiry message is configured to characterize an inquiry that whether the second image forming apparatus needs to perform firmware upgrade; and
transmitting an upgrade response message to the first image forming apparatus, wherein the upgrade response message includes upgrade approval response information or upgrade rejection response information.

11. The firmware upgrade method according to claim 9, before receiving the firmware upgrade package transmitted by the master image forming apparatus to the slave image forming apparatus, further including:
receiving a waiting request message transmitted by the first image forming apparatus; and
according to the waiting request message, waiting for the first image forming apparatus to transmit the firmware upgrade package.

12. The firmware upgrade method according to claim 9, before receiving the firmware upgrade package transmitted by the master image forming apparatus to the slave image forming apparatus, further including:

receiving a networking request message transmitted by the first image forming apparatus; and establishing a local area network with the first image forming apparatus.

13. The firmware upgrade method according to claim 9, after downloading the firmware upgrade package in the server to the master image forming apparatus, further including:

adding a time stamp to the firmware upgrade package from the server;

receiving a second firmware upgrade package transmitted by a third image forming apparatus, wherein the second firmware upgrade package includes a second time stamp; and performing the firmware upgrade according to the firmware upgrade package includes:

when the time stamp is earlier than the second time stamp, performing the firmware upgrade according to the first firmware upgrade package from the server; and when the time stamp is later than the second time stamp, performing the firmware upgrade according to the second firmware upgrade package from the third image forming apparatus.

14. The firmware upgrade method according to claim 9, after receiving the firmware upgrade package transmitted by the master image forming apparatus to the slave image forming apparatus, further including:

transmitting the firmware upgrade package to a fourth image forming apparatus.

15. An image forming apparatus, comprising: a processor; a memory;

and one or more computer programs stored in the memory and including instructions that, when being executed, cause the processor to perform:

acquiring one or more preset role settings from a plurality of image forming apparatuses;

selecting a first master image forming apparatus, from the plurality of image forming apparatuses, as a master image forming apparatus according to a preset role setting of the first image forming apparatus corresponding to a preset firmware download priority that is higher than preset firmware download priorities of other image forming apparatuses in the plurality of image forming apparatuses;

designating a second image forming apparatuses, from the plurality of image forming apparatuses, as a slave image forming apparatus according to a preset role setting of the second image forming apparatus corresponding to a respective preset firmware download priority;

when a server has a firmware upgrade package, downloading the firmware upgrade package to the master image forming apparatus from the server;

adding a time stamp to the firmware upgrade package;

transmitting, from the master image forming apparatus, the firmware upgrade package having the time stamp to the slave image forming apparatus, wherein the firmware upgrade package is configured to upgrade firmware of the master image forming apparatus and the slave image forming apparatus;

when any of the first image forming apparatus or the second image forming apparatus is moved to a new location, updating a firmware download priority for the first image forming apparatus and a firmware download priority for the second image forming apparatus based on attributes of the first image forming apparatus and attributes of the second image forming apparatus in relation to the new location of each of the first image forming apparatus and the second image forming apparatus; and when the firmware download priority of the second image forming apparatus is higher than the firmware download priority of the first image forming apparatus, changing the second image forming apparatus to the master image forming apparatus, and changing the first image forming apparatus to the slave image forming apparatuses without differentiating the preset role setting of the first image forming apparatus and the preset role setting of the second image forming apparatus.

16. A firmware upgrade system, comprising: the image forming apparatus according to claim 15, wherein the image forming apparatus is communicatively connected to another image forming apparatus.

17. An image forming apparatus, comprising:

a processor;

a memory containing one or more computer programs that, when being executed, cause the processor to execute the method according to claim 9.

18. A firmware upgrade system, comprising: the image forming apparatus according to claim 17, wherein the image forming apparatus is communicatively connected to another image forming apparatus.

\* \* \* \* \*